(12) United States Patent
Ravi et al.

(10) Patent No.: US 11,599,381 B2
(45) Date of Patent: *Mar. 7, 2023

(54) PROCESSING FILES VIA EDGE COMPUTING DEVICE

(71) Applicant: Microsoft Technology Licensing, LLC, Redmond, WA (US)

(72) Inventors: Krishnakumar Ravi, Dublin, CA (US); Gautam Gopinadhan, San Jose, CA (US); Piyush Kasliwal, San Jose, CA (US); Vaishnavi Ashok Bhorkar, San Jose, CA (US); Chinmay Nalin Joshi, Sunnyvale, CA (US); Andrew Thaddeus Mason, Woodinville, WA (US); Andrea D'Amato, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/444,031

(22) Filed: Jul. 29, 2021

(65) Prior Publication Data
US 2021/0357250 A1 Nov. 18, 2021

Related U.S. Application Data

(63) Continuation of application No. 16/240,540, filed on Jan. 4, 2019, now Pat. No. 11,080,078.

(Continued)

(51) Int. Cl.
*G06F 9/455* (2018.01)
*G06F 9/38* (2018.01)
*G06F 9/54* (2006.01)

(52) U.S. Cl.
CPC ........ *G06F 9/45558* (2013.01); *G06F 9/3877* (2013.01); *G06F 9/544* (2013.01)

(58) Field of Classification Search
CPC ............... G06F 9/45558; G06F 9/5027; G06F 2209/509
See application file for complete search history.

(56) References Cited

U.S. PATENT DOCUMENTS

2010/0245582 A1* 9/2010 Harel ............... G08B 13/19621
348/143
2013/0282830 A1* 10/2013 Besen ................... G06F 16/185
709/205

(Continued)

OTHER PUBLICATIONS

Kuljeet Kaur; Container-as-a-Service at the Edge: Trade-off between Energy Efficiency and Service Availability at Fog Nano Data Centers; Jun. 2017; IEEE (Year: 2017).*

*Primary Examiner* — Dong U Kim
(74) *Attorney, Agent, or Firm* — Holzer Patel Drennan

(57) ABSTRACT

Examples are disclosed that relate to processing files between a local network and a cloud computing service. One example provides a computing device configured to be located between a local network and a cloud computing service, comprising a logic machine and a storage machine comprising instructions executable to receive, from a device within the local network, a file at a local share of the computing device, and in response to receiving the file, generate a file event indicating receipt of the file at the local share and provide the file event to a virtual machine executing on the computing device. The instructions are further executable to, based upon a property of the file, provide the file to a program operating within a container in the virtual machine to process the file, and send a result of executing the program on the file to the cloud computing service.

20 Claims, 4 Drawing Sheets

Related U.S. Application Data

(60) Provisional application No. 62/733,323, filed on Sep. 19, 2018.

(56) References Cited

U.S. PATENT DOCUMENTS

| | | | |
|---|---|---|---|
| 2014/0289202 A1* | 9/2014 | Chan | G06F 9/54 |
| | | | 707/652 |
| 2017/0064037 A1* | 3/2017 | Das | H04W 4/18 |
| 2018/0152361 A1* | 5/2018 | Chu | H04L 41/0896 |
| 2018/0167445 A1* | 6/2018 | Speight | H04L 67/101 |
| 2018/0183855 A1* | 6/2018 | Sabella | H04W 52/0264 |
| 2018/0260630 A1* | 9/2018 | Cao | G06V 20/41 |
| 2019/0327344 A1* | 10/2019 | Wu | H03M 7/30 |

* cited by examiner

PROCESSING FILES VIA EDGE COMPUTING DEVICE

CROSS REFERENCE TO RELATED APPLICATIONS

This application is a continuation from U.S. Non-Provisional patent application Ser. No. 16/240,540 filed Jan. 4, 2019, which claims priority to U.S. Provisional Patent Application Ser. No. 62/733,323, filed Sep. 19, 2018, and entitled "PROCESSING FILES VIA EDGE COMPUTING DEVICE", the entirety of each of which is hereby incorporated by reference for all purposes.

BACKGROUND

Distributed server systems enable data to be stored and processed in a computing "cloud" accessible by client devices over a wide area network.

SUMMARY

Examples are disclosed that relate to processing files between a local network and a cloud computing service. One example provides a computing device configured to be located between a local network and a cloud computing service. The computing device comprises a logic machine and a storage machine storing instructions executable to receive, from a device within the local network, a file at a local share of the computing device, and in response to receiving the file, generate a file event indicating receipt of the file at the local share and provide the file event to a virtual machine executing on the computing device. The instructions are further executable to, based upon a property of the file, provide the file to a program operating within a container in the virtual machine to process the file, and send a result of executing the program on the file to the cloud computing service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Cloud computing services provide access to computing resources over a network. A client device may leverage a cloud computing service to offload computation and obtain access to large-scale computing resources, among other purposes. However, the remote nature of cloud computing resources may be unsuitable in some scenarios. For example, offloading the processing of large volumes of data to a cloud computing service can impact the bandwidth of a client network. Further, the latency of a network connection may be prohibitively high for some applications.

Accordingly, examples are disclosed that relate to processing data on a computing device located between a local network and a cloud computing service. Such a computing device may be referred to as an "edge device," as it exists physically and/or logically at an "edge" between a client local area network (LAN) and a wide area network (WAN) over which cloud computing resources are accessed. This configuration may enable network access to the computing device with reduced latency and/or higher bandwidth relative to the cloud computing service. Such a computing device may provide functionality offered by the cloud computing service. As a result, data processing that would otherwise be performed at the cloud computing service may be shifted to the computing device, reducing both network bandwidth usage and latency when utilizing such cloud-accessible services. Aspects of the computing device relating to virtualization and use of programmable hardware to accelerate data processing are also disclosed.

Figure 1:
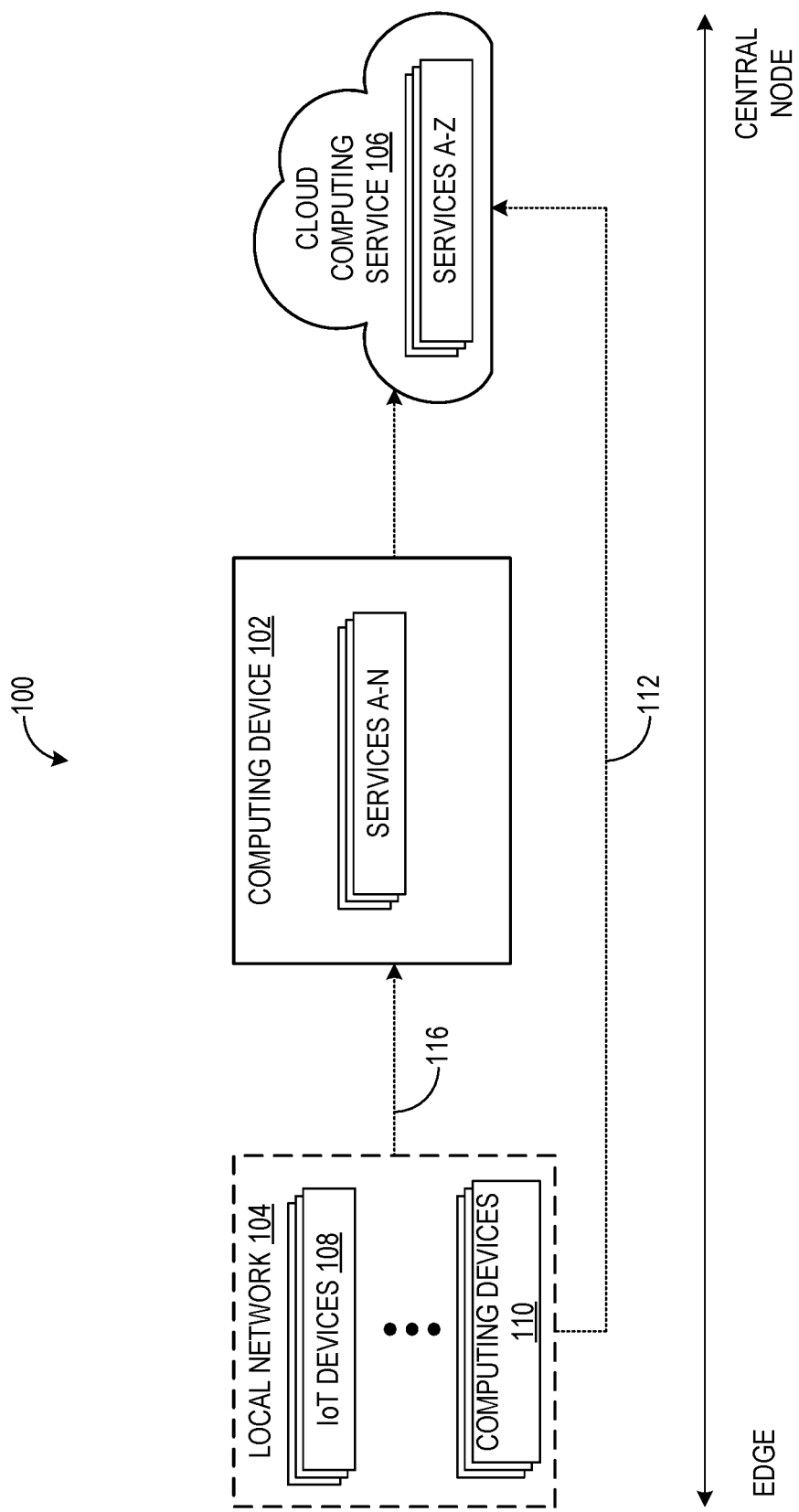
FIG. 1 shows an example computing environment including a computing device located between a local network and a cloud computing service.

FIG. 1 shows an example computing environment 100 including a computing device 102 located between a local network 104 and a cloud computing service 106. Local network 104 includes a set of internet of things (IoT) devices 108 (e.g., optical sensors, acoustic sensors, biometric sensors) and a set of computing devices 110 (e.g., desktop computing devices, mobile computing devices, server computing devices). Any suitable network-enabled devices may be implemented in local network 104, including but not limited to IoT appliances (e.g., climate control devices), end user computers, and/or network devices (e.g., switches, routers, hubs). In other examples, a local network may have any other suitable configuration.

Various devices in local network 104 generate data that may be processed using computing resources outside of the local network. Thus, FIG. 1 depicts cloud computing service 106 that provides cloud computing services A-Z, which may be used to process data from local network 104. Cloud computing service 106 may implement any suitable computing services, including but not limited to data hosting, secure computing, application development support, data streaming, parameter learning, model training, regression, classification, and recommendation.

As described above, the physical separation of cloud computing service 106 and local network 104 may be unsuitable for some uses. For example, the latency of a network connection 112 to cloud computing service 106 may be unsuitable in applications where low latency is desired. Likewise, in-cloud processing also may be unsuitable for applications that involve processing large amounts of information output frequently or continuously by sensing devices, such as image sensors.

To address these issues, computing device 102 may be configured to perform various processing services offered by cloud computing service 106. Locating such services on computing device 102 may provide reduced latency and/or more efficient bandwidth usage in some situations relative to performing such services in the cloud computing service 106. In some examples, the computing device may reside in a common rack or otherwise within a user's LAN. In other examples, the computing device may reside at a different location between the user's LAN and the cloud computing services, such as on or near cellphone towers, on mobile units that are moveable, or at a smaller cloud-like data center.

In the depicted example, computing device 102 provides cloud computing services A-N, which form a subset of the cloud computing services A-Z provided by cloud computing service 106. In other examples, computing device 102 may provide a full set of cloud computing services A-Z provided by cloud computing service 106, and/or services not provided by the cloud computing service. Regardless, the provision of cloud computing services at computing device 102 enables data processing to be shifted from cloud computing service 106 to the computing device, thereby reducing the volume of data sent via network connection 112 and the resultant bandwidth consumed by the network connection, and also reducing network latency.

FIG. 1 depicts a single computing device 102 between local network 104 and cloud computing service 106. In other examples multiple computing devices 102 (e.g. a cluster of devices 102) may be utilized. The use of such a cluster may allow computer resource usage to be dynamically scaled according to client need, and provide redundancy in data storage, among other possible advantages. In yet other examples, computing device 102 may be located in a mobile environment, such as a vehicle, and operatively coupled to a sensor array of the vehicle. In such an example, computing device 102 may process data produced by the sensor array as the data is collected, even at times when the computing device lacks a connection to the cloud computing service 106, and may upload results and/or files to the cloud computing service depending on the availability of a network connection. If, for example, a low-bandwidth network connection is or becomes available while the vehicle is traveling, computing device 102 may transmit lower volume data, such as results or event data (as opposed to files), to cloud computing service 106 at a rate supported by the low-bandwidth connection. Once a higher-bandwidth network connection is available (e.g., upon return of the vehicle to a corresponding facility), data of greater volume, such as files comprising raw sensor data, may be relayed to cloud computing service 106.

Figure 2:
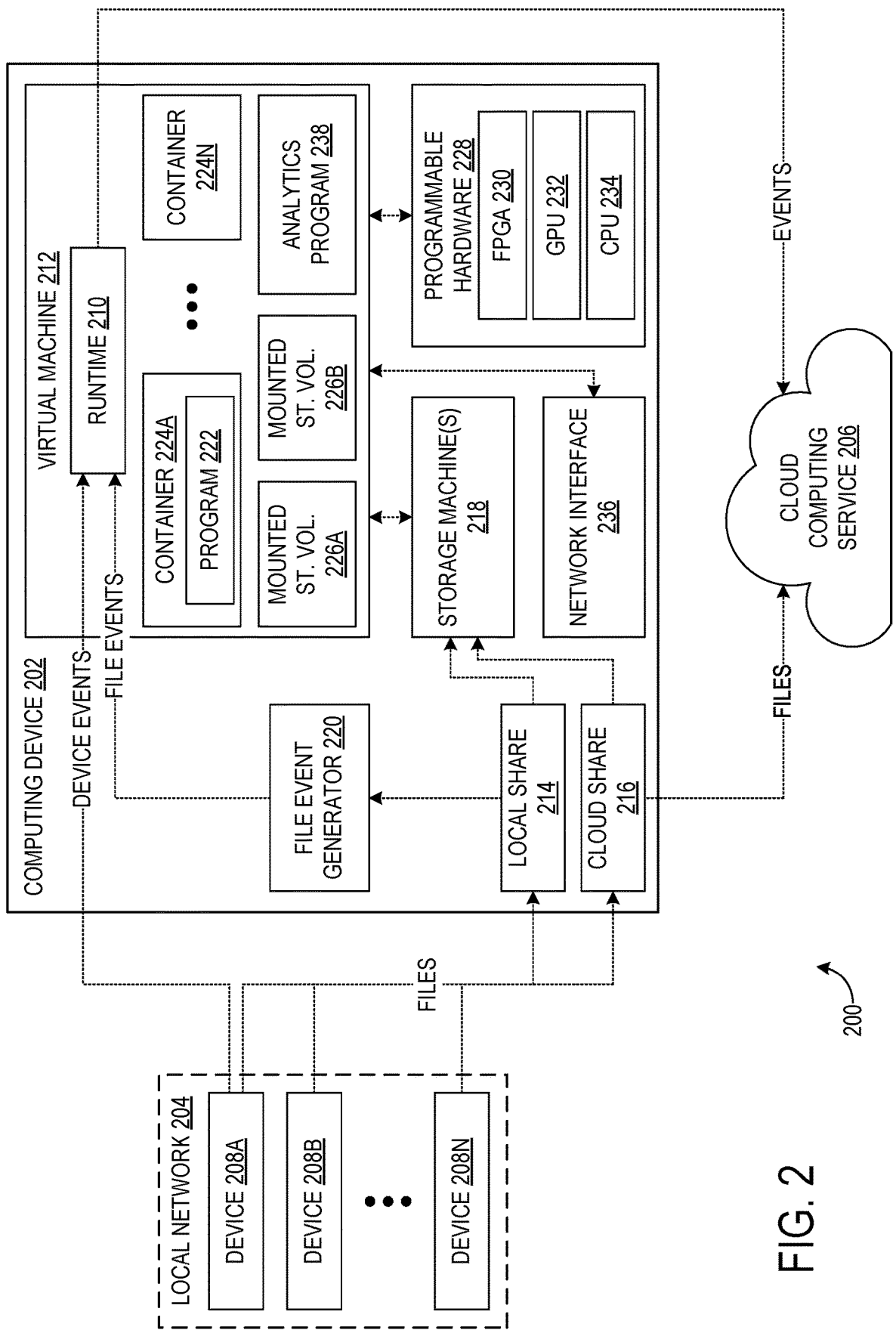
FIG. 2 shows an example computing architecture.

FIG. 2 shows an example computing architecture 200 that may be implemented within environment 100. In architecture 200, an edge computing device 202 is arranged between a local network 204 and a cloud computing service 206. Computing device 202 may provide at least a subset of the cloud computing functions provided by cloud computing service 206. Thus, computing device 202 may provide cloud computing functionality to local network 204 at a network location that yields reduced latency and/or more efficient bandwidth usage compared to the use of the corresponding same functionality in cloud computing service 206.

Local network 204 includes devices 208A-N, which may include IoT devices (e.g., sensors, wearable devices, appliances, actuators), computers (e.g. desktop, laptop, mobile devices, servers, etc.), and/or any other suitable network-enabled devices. Devices 208 may generate device events and/or files and provide them to cloud computing service 206 via computing device 202. As an example, FIG. 2 shows the generation of device events at device 208A, which are provided to a runtime 210 within a virtual machine 212 executing on the computing device. Device events may include information regarding any suitable aspect of a device 208, including but not limited to power state, power consumption, sensor state, and network connectivity. Devices 208 may transmit device events to computing device 202 via any suitable protocol, including but not limited to message queuing telemetry transport (MQTT), advanced message queuing protocol (AMQP), and hypertext transfer protocol (HTTP). Additional detail regarding runtime 210 and virtual machine 212 is described below.

The depicted example also shows the transmission of files generated at device 208A to one or both of a local share 214 and a cloud share 216. Files may be generated, for example, by sensors that are continuously monitoring an environment. In some examples, the cloud computing service 206 may be configured to process such files and generate events based upon the content of the files. For example, the cloud computing service 206 may be configured to recognize features in image data, such as the presence of human faces and/or bodies in security camera image data. However, some such data files may be large and utilize a relatively large amount of bandwidth when uploaded to the cloud on a relatively continuous basis. Further, the round-trip latency between sending the file to the cloud computing service 206 and receiving detected events from the cloud computing service 206 at the local network 204 may be too great for some applications. Thus, computing device 202 may be configured to selectively process files received at local share 214, thereby bringing services offered by cloud computing service 206 to a location physically closer to local network 204. After completing the processing, the result of the processing (e.g. an event), which may be much smaller in size than the file used to produce the result, may be sent to the cloud computing service 206 for storage and/or further processing. Further, in some examples, upon completing processing on a file, the file also may be copied from computing device 202 to cloud computing service 206.

Any suitable conditions may be established to control the provision of files to local share 214 and/or cloud share 216. In some examples, user-selected conditions (e.g., set by an operator of computing device 202) may control whether files are provided to the local share 214 and/or the cloud share 216. Examples of such conditions may include file format, file size, file metadata, file source, and/or time of file generation. In a specific example, device 208A may include a video camera that records a secure area. User-selected conditions may stipulate that video files of a video format generated by device 208A are to be received at local share 214, as low-latency detection of a human presence in the video files is desired. Conversely, analysis of non-video file formats may be of lesser importance and thus processed at the cloud with less concern for latency.

Computing device 202 further comprises one or more storage machines 218 for local storage of files and other data. Respective portions of the storage space provided by storage machine(s) 218 may be allocated to local share 214 and cloud share 216. Cloud share 216 may automatically manage the copying of received files to corresponding storage at cloud computing service 206, and retain cached copies of files based upon available local storage. When files are received at local share 214, a file event generator 220 of computing device 202 may generate file events in response. File events may be provided to runtime 210 of virtual machine 212 to indicate receipt of files in local share 214. In some examples, file events further may comprise metadata describing the files, such as the location of the files in the local share 214, and/or any other suitable metadata (e.g. file type, file origin, etc.).

Virtual machine 212 may selectively provide files received at local share 214 to programs operating within containerized virtual machine instances executing within the virtual machine based upon the file events generated by file event generator 220. As one example, FIG. 2 shows a program 222 operating within a container 224A (e.g. an operating system-level virtualization) of virtual machine 212, which may access files received at local share 214 via a mounted storage volume 226A. In this configuration, files are made accessible to containerized programs by mounting at least a portion of the storage space of storage machine(s) 218 containing the files within virtual machine 212. As shown in FIG. 2, multiple mounted storage volumes (e.g., volumes 226A and 226B) may be created, and on any suitable basis—e.g., a mounted storage volume may be created for each file or data set, for different file formats, and/or for each containerized program and/or container. As also shown in FIG. 2, virtual machine 212 may implement any suitable number N of containers 224, each of which may execute one or more containerized programs.

Virtual machine 212 may determine which container 224 a file received from local share 214 is to be provided, based for example upon a property of the file, metadata provided with the file, and/or upon any other suitable information. The file property may indicate any suitable attributes associated with the file, such as a file type of the file and/or metadata indicating to execute program 222 on the file. As one example, an operator of computing device 202 may instruct virtual machine 212 to provide all files received through local share 214 with a video file format (e.g., MPEG, MP4) to program 222 for processing by the program.

Runtime 210 may provide the results produced by program 222 (as well as the results of programs executed in other containers 224) to cloud computing service 206 for remote storage and/or additional processing, and also may store the results in storage machine(s) 218. Client devices may then access these results, which may provide computing security by separating the location of program execution and result provision. The results of operating the program on the file may have a much smaller size than the file on which the program was executed. As such, providing the results to the cloud may utilize less bandwidth than uploading the file from which the results were produced. As runtime 210 may process device events from external devices, file events from file event generator 220, and program events from the programs running in the containers, the runtime may provide a common mechanism for processing these varying event types.

To illustrate the operation of architecture 200, an example scenario relating to optical sensing in a secure environment follows. Device 208A may represent an optical sensor that records video files corresponding to a secure area. A user configures program 222 operating within container 224A to detect the presence of a human within the video files, and configures the device 208A to provide files to local share 214. File event generator 220 is configured to generate events for such files for processing at computing device 202, for example based upon a file property, such as a format and/or a source of the video files. The video files are received at local share 214 and stored at storage machine(s) 218 within a portion of storage space allocated to the local share. Based on the file property, runtime 210 makes the video files available to program 222 through mounted storage volume 226A. Program 222 is then executed on the video files, and results of the program execution are provided by runtime 210 to cloud computing service 206 (and/or to a client device in local network 204). For examples in which human presence is detected, the results provided to cloud computing service 206 may include an alert that human presence is detected, an identification of the video file including the image data indicating the human presence, and/or a location of the detected human presence in the video file. The video file may be copied to cloud computing service 206 by moving the video file from local share 214 (e.g., from its allocated space within storage machine(s) 218) to cloud share 216 (e.g., to its allocated space within the storage machine(s)). In some examples, video files that are not determined by program 222 to indicate a detected human presence, and more generally files that do not merit an alert according to client-specified conditions, may not be copied to cloud share 216.

Computing device 202 may implement any suitable computing functionality in addition to or alternatively to the examples described above. Additional examples include monitoring of medical and hospital environments (e.g., monitoring patient vitals and biometrics, monitoring secure areas with medication and/or medical equipment), face detection and recognition (e.g., in law enforcement contexts), other high-volume data examples (e.g., genomics, crowd monitoring), and machine learning/artificial intelligence workloads (e.g., network and model training, parameter learning, filtering, regression, classification, recommendation). Similarly, program 222 and other containerized programs operating within virtual machine 212 may be configured for any suitable workload, and may be provided by an owner or operator of computing device 202, a third-party, and/or a provider of cloud computing service 206. As one example, cloud computing service 206 may make programs available for download to computing device 202 (e.g., through a web-based or other user interface) according to a software as a service or other suitable model. Further, in some examples multiple computing devices may be implemented between local network 204 and cloud computing service 206 for scalability and/or redundancy. In such examples, an operator of the computing devices may control which programs are executed on each computing device.

In some examples, program 222 may offload some processing tasks at least in part to programmable hardware 228. As shown in FIG. 2, programmable hardware 228 may include one or more of a field-programmable gate array (FPGA) 230, a graphics processing unit (GPU) 232, and a central processing unit (CPU) 234, but any other suitable programmable hardware also may be employed. As examples, programmable hardware 228 may accelerate program execution via hardware specifically configured to execute single instruction, multiple data (SIMD) and other parallelized workloads, matrix and vectorized computations, floating point operations, integer operations, branch prediction, superscalar operations, and/or other workloads. Programmable hardware 228 may be utilized to accelerate machine learning and artificial intelligence programs, facial recognition, image processing, transcoding, and/or any other programs amenable to the programmable hardware.

In some examples, computing device 202 may process files received from local network 204 in part at the computing device and in part at a remote computing device. To this end, computing device 202 includes a network interface 236 (e.g., a network interface controller) that may be used to communicate with the remote computing device along a network connection. Network interface 236 may also facilitate network communication with local network 204 and/or cloud computing service 206, for example. The remote computing device may be implemented in cloud computing service 206, such that computing device 202 cooperates with the cloud computing service to perform processing (e.g., execute program 222). Alternatively or additionally, the remote computing device may be located externally (not shown) to computing device 202 and cloud computing service 206. In this example, the remote computing device may be implemented by a provider of cloud computing service 206, an operator of computing device 202, an operator of local network 204, or a third party.

Virtual machine 212 further may include an analytics program 238 executable to generate analytic information regarding the processing of files by the virtual machine. The analytic information may be sent—e.g., via runtime 210—to cloud computing service 206. The analytic information may inform cloud computing service 206 of various information beyond the file-related events provided to the cloud computing service described above, including but not limited to the number of file and/or device events processed at computing device 202, the rate of file/data event processing at the computing device, and/or hardware performance of the computing device. The analytic information may be hosted by cloud computing service 206 and made accessible via a web-based user interface, for example. In some examples, analytics program 238 may be provided by an operator of cloud computing service 206 (e.g., preinstalled on computing device 202).

Figure 3:
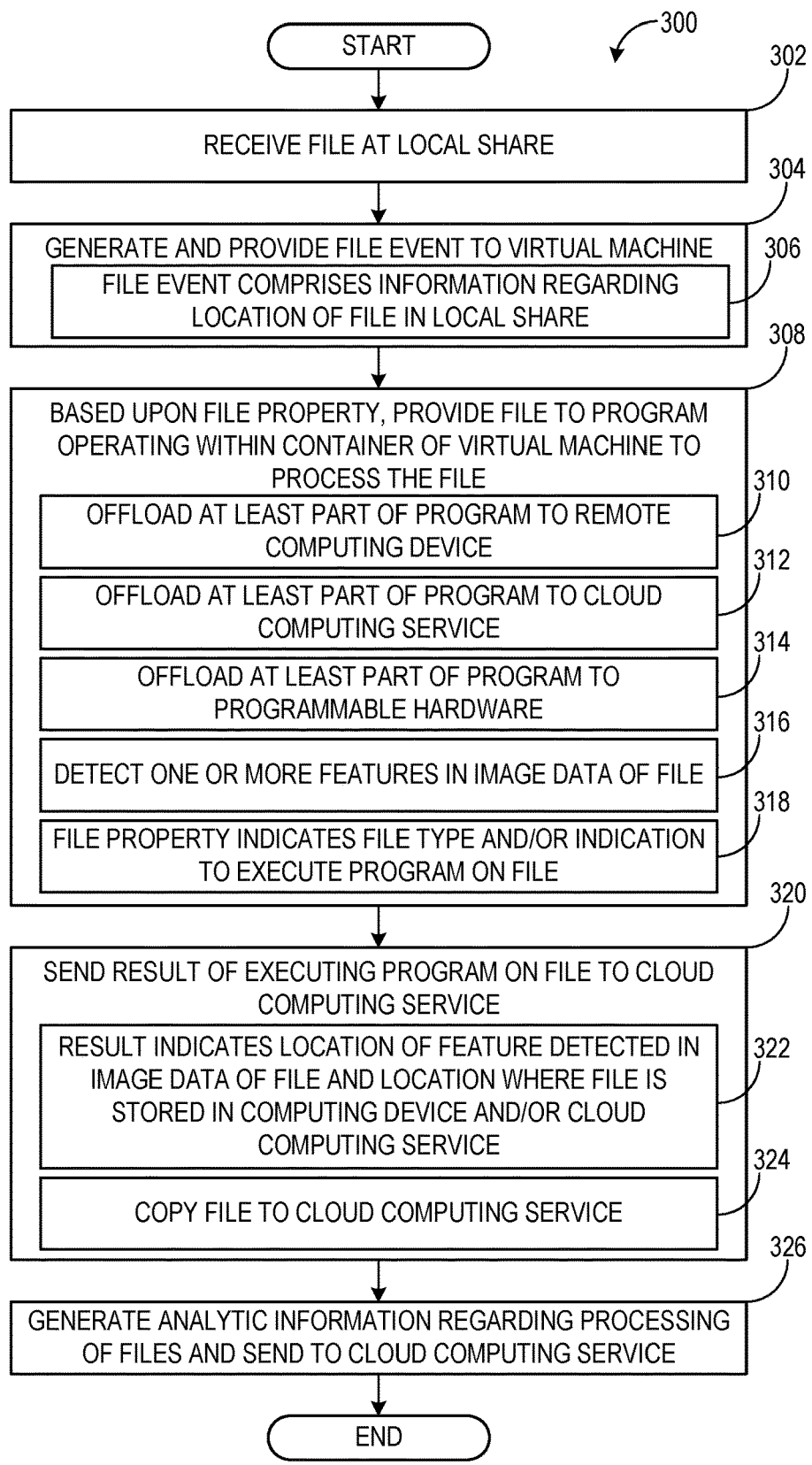
FIG. 3 shows a flowchart illustrating an example method of executing a program at a computing device located between a local network and a cloud computing service.

FIG. 3 shows a flowchart illustrating a method 300 of executing a program at a computing device located between a local network and a cloud computing service. Method 300 may be executed on computing device 102 and/or 202, as examples. At 302, method 300 includes receiving, from a device within the local network, a file at a local share of the computing device. In some examples, the file may include image data. In other examples, the file may include any other suitable type of data from any suitable source, including IoT devices.

At 304, method 300 includes, in response to receiving the file, generating a file event and providing the file event to a virtual machine executing on the computing device. The file event may indicate receipt of the file at the local share. Further, the file event may comprise information 306 regarding a location of the file in the local share.

At 308, method 300 includes, based upon a property of the file, providing the file to a program operating within a container in the virtual machine to process the file. Process 308 may include offloading 310 part of the program to a remote computing device, which may be implemented in the cloud computing system or externally to the cloud computing system and computing device, for example. Process 308 alternatively or additionally may include offloading 312 part of the program to the cloud computing service. For example, the program may be executed in part at the computing device and in part at the cloud computing service. Process 308 further may include offloading 314 at least part of the program to programmable hardware. The programmable hardware may be configured to accelerate execution of the program, and may include one or more of an FPGA, GPU, and CPU, as examples. In some examples, process 308 may include detecting 316 one or more features in image data in the file via the program operating within the container. As examples, the feature(s) may include a human face and/or facial features, as part of face detection and/or facial recognition. The file property may indicate 318 a type or format of the file, a size of the file, a time of file generation, other metadata, a source of the file, and/or an indication to execute the program on the file.

At 320, method 300 includes sending a result of executing the program on the file to the cloud computing service. The result may indicate 322 a location of a feature detected in image data in the file and a location where the file is stored in the computing device and/or the cloud computing service. Method 300 further may include copying 324 the file to the cloud computing service.

At 326, method 300 includes generating analytic information regarding the processing of files at the computing device, and sending the analytic information to the cloud computing service. The analytic information may include information regarding the number of file and/or device events processed at the computing device, the rate of file/data event processing at the computing device, and/or hardware performance of the computing device, as examples.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 4:
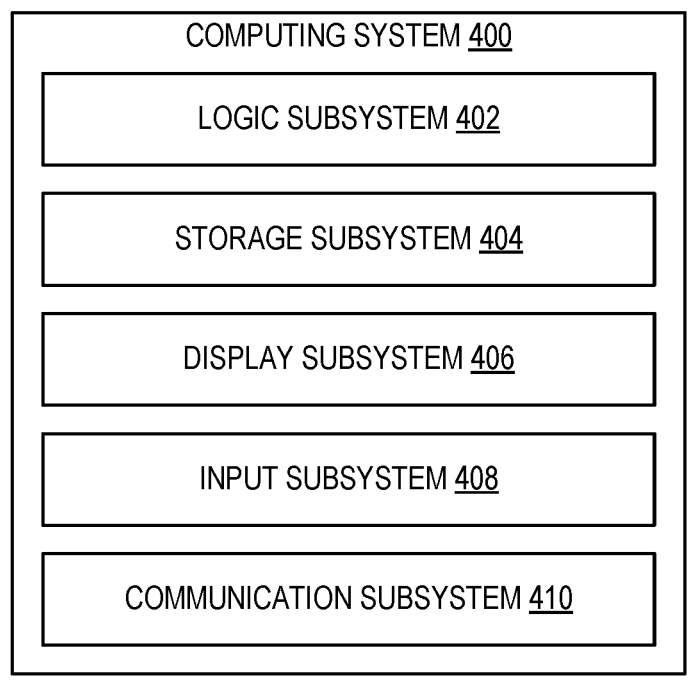
FIG. 4 shows a block diagram illustrating an example computing system.

FIG. 4 schematically shows a simplified representation of a computing system 400 configured to provide any to all of the compute functionality described herein. Computing system 400 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices or combinations thereof some examples, computing system 400 may represent one or more of the computing devices, computing systems, and/or computing services described herein. As examples, computing system may represent one or more of the devices in local network 104 and/or 204, computing device 102 and/or 202, and/or cloud computing service 106 and/or 206 (e.g., one or more computing devices implemented by the cloud computing service).

Computing system 400 includes a logic subsystem 402 and a storage subsystem 404. Computing system 400 may optionally include a display subsystem 406, input subsystem 408, communication subsystem 410, and/or other subsystems not shown in FIG. 4.

Logic subsystem 402 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 404 includes one or more physical devices configured to temporarily and/or permanently hold computer information such as data and instructions executable by the logic subsystem. When the storage subsystem includes two or more devices, the devices may be collocated and/or remotely located. Storage subsystem 404 may include volatile, nonvolatile, dynamic, static, read/write, read-only, random-access, sequential-access, location-addressable, file-addressable, and/or content-addressable devices. Storage subsystem 404 may include removable and/or built-in devices. When the logic subsystem executes instructions, the state of storage subsystem 404 may be transformed—e.g., to hold different data.

Aspects of logic subsystem 402 and storage subsystem 404 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to hardware and any software, instructions, and/or other components cooperating with such hardware to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application) cooperating with a remote component (e.g., cloud computing service).

When included, display subsystem 406 may be used to present a visual representation of data held by storage subsystem 404. This visual representation may take the form of a graphical user interface (GUI). Display subsystem 406 may include one or more display devices utilizing virtually any type of technology. As examples, display subsystem 406 may include a desktop monitor, mobile display, and/or television, each of which may employ light-emitting diode (LED), liquid crystal display (LCD), and/or organic light-emitting diode (OLED) display technologies.

When included, input subsystem 408 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 410 may be configured to communicatively couple computing system 400 with one or more other computing devices. Communication subsystem 410 may include wired and/or wireless communication devices compatible with one or more different communication protocols. The communication subsystem may be configured for communication via personal-, local- and/or wide-area networks.

An example provides a computing device configured to be located between a local network and a cloud computing service, the computing device comprising a logic machine and a storage machine comprising instructions executable by the logic machine to receive, from a device within the local network, a file at a local share of the computing device, in response to receiving the file, generate a file event and provide the file event to a virtual machine executing on the computing device, the file event indicating receipt of the file at the local share, based upon a property of the file, provide the file to a program operating within a container in the virtual machine to process the file, and send a result of executing the program on the file to the cloud computing service. In such an example, the instructions may be executable to process the file via one or both of a field-programmable gate array and a graphics processing unit of the computing device. In such an example, the instructions may be executable to process the file in part at the computing device and in part at a remote computing device. In such an example, the remote computing device may be implemented in the cloud computing service. In such an example, the instructions may be executable to, after executing the program, copy the file to the cloud computing system. In such an example, the file event alternatively or additionally may comprise information regarding a location of the file in the local share. In such an example, the file may include image data, and the program may be executable to detect one or more features in the image data. In such an example, the result may indicate a location of a feature detected in the image data and a location at which the file is stored in one or more of the computing device and the cloud computing system. In such an example, the virtual machine alternatively or additionally may be configured to receive, from the device within the local network, a device event. In such an example, the instructions alternatively or additionally may be executable to generate analytic information regarding processing of files by the virtual machine, and to send the analytic information to the cloud computing service. In such an example, the property of the file may indicate one or both of a file type of the file and an indication to execute the program on the file.

Another example provides, at a computing device configured to be located between a local network and a cloud computing service, a method comprising receiving, from a device within the local network, a file at a local share of the computing device, in response to receiving the file, generating a file event and providing the file event to a virtual machine executing on the computing device, the file event indicating receipt of the file at the local share, based upon a property of the file, providing the file to a program operating within a container in the virtual machine to process the file, and sending a result of executing the program on the file to the cloud computing service. In such an example, the file may be processed via one or both of a field-programmable gate array and a graphics processing unit of the computing device. In such an example, the file may be processed in part at the computing device and in part at a remote computing device. In such an example, the remote computing device may be implemented in the cloud computing service. In such an example, the method may further comprise, after executing the program, copying the file to the cloud computing system. In such an example, the file event alternatively or additionally may comprise information regarding a location of the file in the local share. In such an example, the property of the file may indicate one or both of a file type of the file and an indication to execute the program on the file.

Another example provides a computing device configured to be located between a local network and a cloud computing service, the computing device comprising a logic machine, and a storage machine comprising instructions executable by the logic machine to receive, from a device within the local network, a file at a local share of the computing device, in response to receiving the file, generate a file event and provide the file event to a virtual machine executing on the computing device, the file event indicating receipt of the file at the local share, based upon a property of the file, provide the file to a program operating within a container in the virtual machine, offload the program at least in part to programmable hardware configured to accelerate execution of the program, and send a result of executing the program on the file to the cloud computing service. In such an example, the programmable hardware may include one or both of a field-programmable gate array and a graphics processing unit.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device configured to be located between a local network and a cloud computing service, the computing device comprising
a logic machine; and
a storage machine comprising instructions executable by the logic machine to receive, from a device within the local network, a file;
responsive to receiving the file, and based at least upon a property of the file, generate a file event and provide the file event to a virtual machine executed on the computing device, the file event indicating receipt of the file at the computing device;
upon receiving the file event at the virtual machine, and based at least upon the property of the file, provide the file to a program operating within the virtual machine to process the file;
responsive to a lower bandwidth network connection to the cloud computing service being available, send a result of processing the file from the computing device to the cloud computing service until a higher bandwidth network connection is available; and
responsive to the higher bandwidth network connection being available, send the file from the computing device to the cloud computing service.

2. The computing device of claim 1, wherein the instructions are executable to process the file in part at the computing device and to send the file to a remote computing device for processing in part at the remote computing device.

3. The computing device of claim 2, wherein the remote computing device is implemented in the cloud computing service.

4. The computing device of claim 1, wherein the file event comprises information regarding a location of the file in storage on the computing device.

5. The computing device of claim 1, wherein the virtual machine is further configured to receive, from the device within the local network, a device event comprising information regarding one or more of a power state of the device, a power consumption by the device, a sensor state of the device, and a network connectivity of the device.

6. The computing device of claim 1, further comprising instructions executable to, based at least upon the property of the file, provide the file to a cloud share of the computing device, the cloud share configured to copy the file and additional files received at the cloud share to the cloud computing service.

7. The computing device of claim 6, wherein the cloud share is further configured to store a cached copy of the file.

8. The computing device of claim 1, wherein the computing device is configured to provide one or more cloud computing services provided by the cloud computing service.

9. The computing device of claim 1, wherein the instructions executable to provide the file to the program operating within the virtual machine to process the file are executable to process the file at least in part via programmable hardware located on the computing device.

10. At a computing device configured to be located between a local network and a cloud computing service, a method comprising
receiving, from a device within the local network, a file at the computing device;
responsive to receiving the file, generating a file event and providing the file event to a virtual machine, the file event indicating receipt of the file at the computing device, the virtual machine including two or more containers in each of which one or more programs operate;
upon receiving the file event at the virtual machine, and based at least upon a property of the file, identifying at the virtual machine a selected container of the two or more containers to which to provide the file, and providing the file to a selected program operating in the selected container;
sending a result of executing the selected program on the file to the cloud computing service; and
based at least on a bandwidth of a network connection to the cloud computing service meeting a threshold bandwidth, sending the file to the cloud computing service.

11. The method of claim 10, wherein the property of the file includes a file type of the file, and wherein the program is configured to process the file based upon the file type.

12. The method of claim 10, wherein the property of the file includes metadata indicating the selected program.

13. The method of claim 10, further comprising creating a respective storage volume for each of the two or more containers, wherein the file is stored in the respective storage volume created for the selected container.

14. The method of claim 10, further comprising receiving, at a runtime of the virtual machine, a device event from the device.

15. The method of claim 10, further comprising executing the program in part at the computing device and in part at the cloud computing service.

16. An edge computing device configured to be located between a local network and a cloud computing service, the edge computing device comprising
a logic machine; and
one or more storage machines comprising instructions executable by the logic machine to
receive, from a device within the local network, a file;
via a file event generator, and based at least upon a property of the file, generate a file event and provide the file event to a virtual machine executed on the edge computing device;
based at least upon the property of the file, provide access to the file to a containerized program operating within an instance of the virtual machine by mounting at least a portion of storage space at which the file is stored;

send a result of executing the containerized program on the file to the cloud computing service; and based at least on a bandwidth of a network connection to the cloud computing service meeting a threshold bandwidth, send the file to the cloud computing service.

17. The edge computing device of claim 16, wherein the device within the local network comprises one or more of a sensor, a computing device, an appliance, and a wearable device.

18. The edge computing device of claim 16, wherein the instructions executable to provide access to the file to the containerized program are executable to process the file at least in part via programmable hardware located on the edge computing device.

19. The edge computing device of claim 16, wherein the device within the local network is configured to transmit a device event to the edge computing device via one or more of message queuing telemetry transport, advanced message queuing protocol, and hypertext transfer protocol.

20. The edge computing device of claim 16, wherein the device within the local network is a first device, further comprising instructions executable to send the result to a second device within the local network.

\* \* \* \* \*